United States Patent [19]
Bernd et al.

[11] 3,872,750
[45] Mar. 25, 1975

[54] COPY CONTROL FOR USE IN TOOL MACHINES

[75] Inventors: Hubert Bernd, Partenstein; Friedel Liedhegener, Lohr am Main, both of Germany

[73] Assignee: G.L. Rexroth GmbH, Lohr am Main, Germany

[22] Filed: Apr. 20, 1973

[21] Appl. No.: 353,136

[30] Foreign Application Priority Data
Apr. 22, 1972 Germany.............. 2219792

[52] U.S. Cl. ........................ 82/14 A, 90/62 R
[51] Int. Cl. ............................ B23b 3/28
[58] Field of Search ...... 82/14 A, 14 B, 14 C, 14 R; 90/62 R

[56] References Cited
UNITED STATES PATENTS

| | | | |
|---|---|---|---|
| 2,373,265 | 4/1945 | Salisbury | 82/14 B |
| 2,695,543 | 11/1954 | VonZelewsky | 82/14 A |
| 2,782,568 | 2/1957 | Cafolla et al. | 90/62 R |
| 3,104,640 | 9/1963 | Sassen et al. | 82/14 R |
| 3,237,492 | 3/1966 | Massey | 90/62 R |
| 3,570,370 | 3/1971 | Ristau | 90/62 R |

Primary Examiner—Leonidas Vlachos
Attorney, Agent, or Firm—Michael S. Striker

[57] ABSTRACT

A template has a contour which is to be copied, and a tracing device is movable relative to the template for tracing the contour thereof. The tracing device has a contact member which contacts the template and moves along the contour of the same, and this contact member has two or more contact faces of different diameters which can individually engage the template contour.

5 Claims, 2 Drawing Figures

COPY CONTROL FOR USE IN TOOL MACHINES

BACKGROUND OF THE INVENTION

The present invention relates generally to a copy control for use in tool machines, and more particularly to a copy control having a template the contour of which is to be traced so as to be reproduced on a workpiece, and a tracing device for tracing the contour of the template.

Copy controls of the general type herein question are of course well known. It is also known to make the control sleeve of the control valve which controls the movement of the tracing device in such copy controls, adjustable so as to permit a variation in the tracing of the contour. This makes the copy control usable with one and the same template for tracing differently dimensioned contours. In this prior-art approach it is necessary in order for the contact member of the tracing device to be able to return the control piston which effects movement of the contact member, back to its starting position, to traverse a larger or a smaller distance in dependence upon the axial position of the control sleeve of the valve. However, this of course determines the distance through which the carriage of the tracing device must be moved, and therefore the axial position of the control sleeve of the valve also determines the depth to which the tool being controlled by the contour control will remove material or otherwise act upon the workpiece.

Experience has shown that the axial shifting of the control sleeve permits only a limited depth of material removal, independently of the increased technical expenditure required for permitting this adjustment of the control sleeve, because the contact member of the arrangement must be displaced out of its path only by a small distance. In actual practice it is frequently necessary, however, for the tool to cut into the workpiece to depths of up to 20 millimeters. If this was necessary it was also a requisite for the template to be exchanged, using a special device for carrying out the exchange. This, in turn, of course increases the space requirements of the copy control which is a further undesirable feature because space is frequently at a premium.

SUMMARY OF THE INVENTION

It is, accordingly, an object of the present invention to provide a copy control for use in tool machines, which avoids the disadvantages of the prior art.

More particularly it is an object of the present invention to provide such a copy control which permits the tool being controlled to make cuts into the workpiece of several different depths, using only a single template.

Another object of the timplate is to provide such a copy control which permits a variation of the cutting depth, using a single template, independently of the cutting depth required in any given specific operation.

In keeping with these objects, and with others which will become apparent hereafter, one feature of the invention resides, in a copy control for use in tool machines, in a combination which briefly stated comprises a template having a contour to be copied, and tracing devices for tracing the contour of this template. The template and the tracing device are shiftable with reference to each other for different tracing operations, and a contact member is provided on the tracing device for contacting the template. The contact member has a plurality of contact faces of different diameters adapted to individually engage the template for tracing the contour thereof.

The novel features which are considered characteristic for the invention are set forth in particular in the appended claims. The invention itself, however, both as to its construction and its method of operation, together with additional objects and advantages thereof, will best be understood from the following description of specific embodiments when read in connection with the accompanying drawing.

DESCRIPTION OF THE PREFERRED EMBODIMENTS

Figure 1:
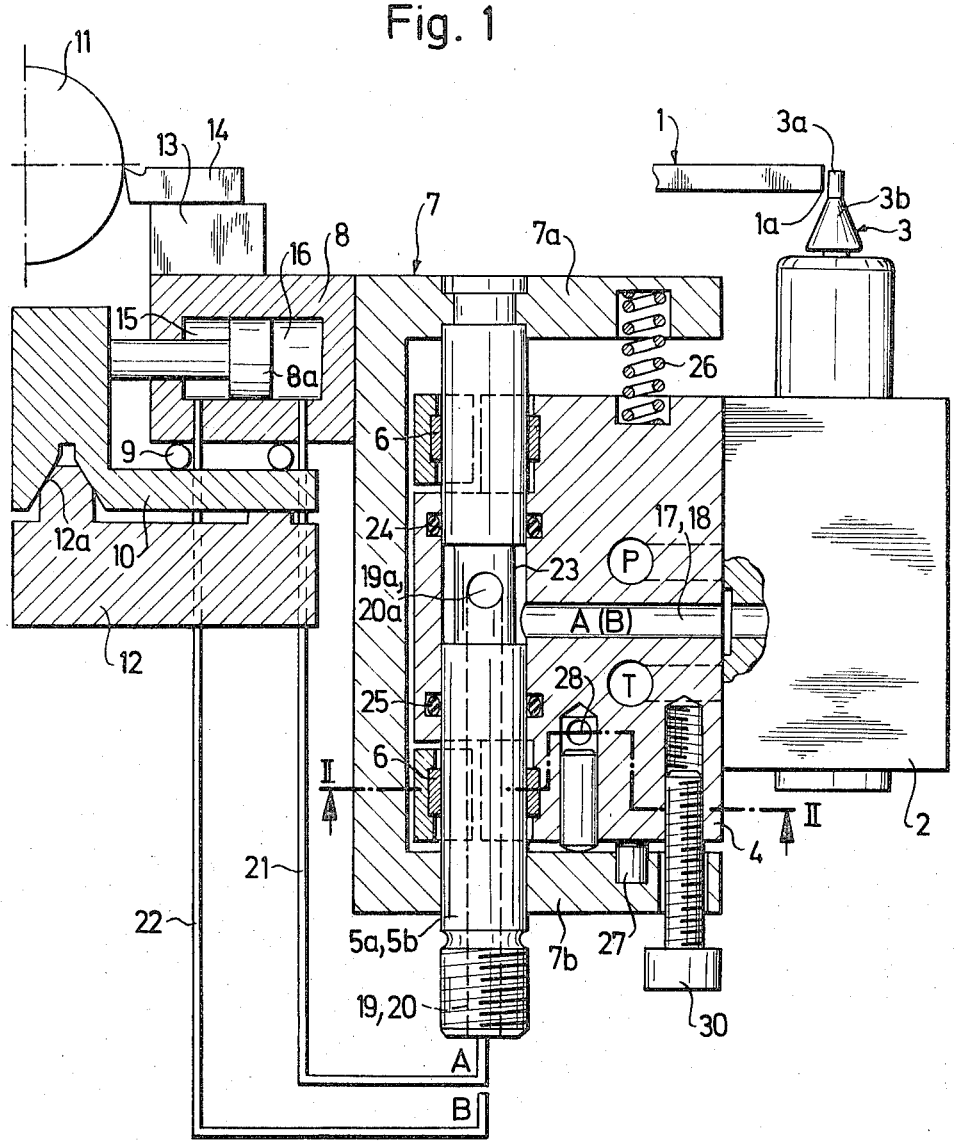
FIG. 1 is a partly sectioned view illustrating an embodiment of the present invention.
Figure 2:
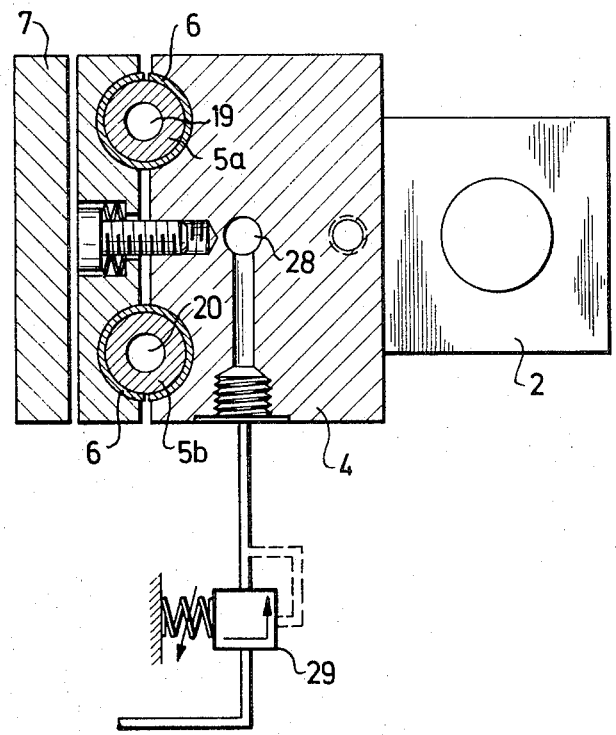
FIG. 2 is a section taken on line II—II of FIG. 1.

Discussing the embodiment illustrated in FIGS. 1 and 2, it will be seen that reference numeral 1 identifies the fragmentarily illustrated stationarily mounted template 1 whose contour is to be traced. Reference numeral 2 identifies a tracing device provided with a contact member 3. The tracing device 2 is mounted on a carriage 4 which can be guided by means of bearings 6 on two guide rods 5a, 5b. A support 7 is provided, having two wall portions 7a, 7b in which the guide rods 5a, 5b are secured. The support 7 is mounted on a member 8 which is displaceable on the carriage 10 by means of the roller bearings 9, in the direction towards the workpiece 11. The carriage 10 is shiftable on the plate 12 in direction normal to the plane of the drawing, on the guide 12a. The member 8 also carries the tool holder 13 with the tool 14 whose movements are controlled by the tracing of the template contour by the member 3.

The member 8 constitutes the work cylinder for the device and forms an interior space which is subdivided by the illustrated piston into two chambers 15 and 16 located at opposite sides of the piston. Pressurized fluid is admitted into these chambers 15, 16 by means of channels 17 and 18 which are formed in the carriage 4, and bores 19, 20 provided in the guide rods 5a, 5b (see FIG. 2) as well as via the conduits 21, 22 which connect the guide rods 5a and 5b with the respective chambers 15 and 16. The guide rods are provided with circumferential recesses 23 whose length corresponds to the maximum distance of movement of the carriage and which serves to provide a connection between the channels 17, 18 and the axial bores 19, 20 of the guide rods 5a, 5b. For this purpose the guide rods are provided with transverse bores 19a, 20a which communicate with the recesses 23 as well as with the longitudinal bores 19, 20, respectively. Sealing rings 24 and 25 serve to seal the recesses 23 relative to their exterior.

A spring 26 urges the carriage against a fixed stop 27 when the chamber 28 (see FIG. 1) is not pressurized. When the chamber 28 is pressurized, however, in dependence upon the setting of the pressure regulating valve 29 which is shown in FIG. 2, then the carriage moves in the direction of the wall portion 7a and in so doing overcomes the force of the spring 26 until the spring force, which increases due to the increasing compression of the spring, reaches a level at which it counterbalances force resulting from pressurization of the space 28. The maximum distance through which the carriage 4 can be displaced is determined by the set screw 30 which serves as an abutment or stop.

When the carriage 4 is displaced in the direction of the wall portion 7a the member 3 is shifted relative to the template 1 in such a manner that it is no longer the circumferential surface of the cylindrical portion 3a which contacts the contour of the template 1, but instead the conically divergent portions 3b, or rather the circumferential surface thereof, which contacts the edge 1a of the template 1, that is which serves to trace the contour of the latter. At the same time this causes a displacement of the tool of the carriage 8 in the direction of the cylinder chamber 16 and results in a lifting-off of the tool 14 from the workpiece 11. This position can correspond during the working of the workpiecee 11 to an operating step in which the workpiece undergoes coarse material removal, whereas when the circumferential surface of the cylindrical portion 3a is in contact with the edge 1a of the template 1, this can correspond to an operating step in which the workpiece is subjected to a surface-finishing material removal. In any case, in the aforementioned position the carriage 4 is pressed by the spring 26 against the stationary stop 27, so that the force relationships in this position will always be identical, meaning that the accuracy with which the setting and the resulting operations on the workpiece 11 can be reproduced in successive workpiece-treating operations, is high and always assured. In fact, this accuracy is further increased in that there are fixed connections between the member 3 and the member 8, whereby those connections that could introduce inaccuracy are avoided.

It will be understood that each of the elements described above, or two or more together, may also find a useful application in other types of constructions differing from the types described above.

While the invention has been illustrated and described as embodied in a copy control, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. In a copy control for use in tool machines, a combination comprising a template having a contour to be copied; a tracing device for tracing the contour of said template and comprising a carriage mounted for movement normal to a plane of said template, said template and said device being shiftable with reference to each other for different tracing operations; an elongated contact member on said carriage of said tracing device for contacting said template, said contact member comprising two portions of which one has a cylindrical contact face and the other has a conically divergent contact face so that contact faces of different diameters may individually engage said template and trace the contour thereof; a fluid-operated cylinder and piston unit connected with said carriage for displacing the same in direction longitudinally of said contact member towards said template; adjustable fluid control means for controlling the amount of said displacement; a biasing spring permanently tending to move said carriage opposite to said direction; and a stop for preventing said carriage from moving in said direction beyond a limited distance.

2. A combination as defined in claim 1; further comprising a tool movable with said carriage into and out of engagement with a workpiece; mounting means mounting said carriage for shifting thereof normal to said direction, the position of said tool relative to said workpiece being dependent upon the displacement of said carriage in said direction and the diameter of a respective contact face which is in engagement with said template.

3. A combination as defined in claim 1, wherein said cylinder and piston unit is a hydraulic cylinder and piston unit.

4. A combination as defined in claim 1; said stop being an adjustable stop cooperating with said carriage for limiting the maximum displacement thereof.

5. A combination as defined in claim 1, wherein said fluid control means varies the pressure of fluid admitted to said cylinder and piston unit to thereby vary the displacement of said carriage to positions intermediate said template and said stop.

* * * * *